United States Patent [19]

Shibata et al.

[11] Patent Number: 5,485,950
[45] Date of Patent: Jan. 23, 1996

[54] COMPOSITE MATERIAL, PROCESS FOR PRODUCING COMPOSITE MATERIAL, AND PROCESS FOR PRODUCING COMPOSITE MATERIAL MOLDING

[75] Inventors: Kenichiro Shibata; Toshiyuki Hatta; Fumio Matsuyama; Masahiro Miyamoto; Manabu Okui; Masaya Nishi, all of Osaka, Japan

[73] Assignee: Sumitomo Electric Industries, Ltd., Osaka, Japan

[21] Appl. No.: 450,396

[22] Filed: May 25, 1995

Related U.S. Application Data

[63] Continuation of Ser. No. 83,291, Jun. 29, 1993, abandoned.

[30] Foreign Application Priority Data

Jun. 29, 1992 [JP] Japan ................................. 4-211969
Dec. 12, 1992 [JP] Japan ................................. 4-360729

[51] Int. Cl.⁶ .......................... B23K 20/02; B23K 20/14
[52] U.S. Cl. .................... 228/194; 228/118; 228/262.44
[58] Field of Search ............................ 228/262.44, 194, 228/262.5, 118

[56] References Cited

U.S. PATENT DOCUMENTS

| 2,269,523 | 1/1942 | Deutsch | 228/262.44 |
| 2,473,712 | 6/1949 | Kinney | 228/262.44 |
| 2,591,926 | 4/1952 | Gibson et al. | 228/262.5 |
| 3,210,840 | 10/1965 | Ulam | 228/262.44 |
| 4,564,001 | 1/1986 | Maeda | 220/453 X |

FOREIGN PATENT DOCUMENTS

| 1556102 | 3/1968 | France . | |
| 2088916 | 1/1972 | France . | |
| 2534187 | 4/1984 | France . | |
| 2572331 | 5/1986 | France . | |
| 103685 | 5/1986 | Japan | 228/194 |
| 128180 | 5/1991 | Japan | 228/193 |

Primary Examiner—Kenneth J. Ramsey
Attorney, Agent, or Firm—Sughrue, Mion, Zinn, Macpeak & Seas

[57] ABSTRACT

A composite material comprising a magnetic metal plate and an aluminum or aluminum alloy plate, the magnetic metal plate and the aluminum or aluminum alloy plate being clad together by an axial hot pressing. A process for producing a composite material which comprises the step of: cladding a magnetic metal plate with an aluminum or aluminum alloy plate by an axial hot pressing. A process for producing a composite material molding which comprises the steps of: cladding a magnetic metal plate with an aluminum or aluminum alloy plate by an axial hot pressing thereby obtaining a composite plate material; and subsequently subjecting the composite plate material to press molding and/or stamping and cutting.

18 Claims, 3 Drawing Sheets

COMPOSITE MATERIAL, PROCESS FOR PRODUCING COMPOSITE MATERIAL, AND PROCESS FOR PRODUCING COMPOSITE MATERIAL MOLDING

This is a continuation of application No. 08/083,291 filed Jun. 29, 1993, now abandoned.

FIELD OF THE INVENTION

This invention relates to a composite material, a process for producing a composite material and a process for producing a composite material molding. More particularly, it relates to a composite material and a composite material molding which are useful, though not particularly limited, as receptacles of cooking utensils, especially electromagnetic cookers, and to processes for producing the composite material and composite material molding.

BACKGROUND OF THE INVENTION

In the prior art process, receptacles to be used in electromagnetic cookers, such as inner pots of rice cookers, are produced from a composite plate base material composed of a heat-generating magnetic metal plate such as iron, stainless steel or the like and a heat-conducting aluminum or aluminum alloy plate, by subjecting the base material to a press mold working such as deep drawing in such a way that the aluminum or aluminum alloy plate is arranged inward. The inner surface of the pot is generally coated with a fluorine resin to prevent sticking of cooked rice.

In general, such a composite-plate base material is produced by subjecting a magnetic metal plate and an aluminum or aluminum alloy plate to rolling thereby making these plates into a clad material, namely a composite material (as described, e.g., in JP-B-54-3468 and JP-B-54-9985). (The term "JP-B" as used herein means an "examined Japanese patent publication")

Rolling is useful for the production of clad materials in a large quantity. However, being produced by rolling, thickness of the resulting plates varies greatly due to compressed cladding of the aluminum or aluminum alloy plate, thus causing serious problems from the processing point of view such as generation of cracking and crinkling during press molding of the clad plates. In addition to these problems, such clad plates are apt to cause adhesion of foreign materials and generation of flaws, thus requiring a surface polishing step, and clad strength of the plates becomes partially weak in some cases thus causing separation during the press working.

Recently, the inventors of the present invention have proposed a process for the cladding of a magnetic metal plate and an aluminum or aluminum alloy plate by an isotropic hot pressing (as described in JP-A-5-116244). (The term "JP-A" used herein means an unexamined published Japanese patent application.) In the isotropic heat pressing process, high pressure heating is carried out in an atmosphere of an ultra high pressure inert gas (mainly Ar gas) using a pressure vessel equipped with a heating system. By this treatment, a synergistic effect of high temperature heating and the isotropic pressure by gas pressure is applied to the plates, thereby applying plastic working and diffusion of composing elements to the materials constituting the plates.

Most characteristic advantages of the isotropic heat pressing are that clad plate materials can be obtained without using the rolling process which is generally employed in the field of such type of composite plate materials and that a magnetic metal plate such as iron, stainless steel or the like and an aluminum or aluminum alloy plate can be made into a clad plate directly without interposing a diffusion metal layer. This process, however, has disadvantages in that it requires high facility operation cost because of the use of a high pressure gas and it requires disposable metal capsules which cause increase in the production cost due to considerable labor for the vacuum sealing and removal of the capsules.

The present invention contemplates overcoming the aforementioned problems involved in the prior art, as well as disadvantages of the above-described isotropic hot pressing.

SUMMARY OF THE INVENTION

In view of the above, an object of the present invention is therefore to reduce fraction defective of molding working by improving composite plate materials in quality and, desirably, to increase mass productivity of the composite materials.

Other objects and effects of the present invention will be apparent from the following description.

The present invention provides, as a first aspect, a composite material comprising a magnetic metal plate and an aluminum or aluminum alloy plate, the magnetic metal plate and the aluminum or aluminum alloy plate being clad together by an axial hot pressing.

The present invention also provides, as a second aspect, a process for producing a composite material which comprises the step of: cladding a magnetic metal plate with an aluminum or aluminum alloy plate by an axial hot pressing.

The present invention further provides, as a third aspect, a process for producing a composite material molding which comprises the steps of: cladding a magnetic metal plate with an aluminum or aluminum alloy plate by an axial hot pressing thereby obtaining a composite plate material; and subsequently subjecting the composite plate material to press molding and/or stamping and cutting.

The magnetic plate used herein may be those comprising iron or stainless steel, but is not limited to these.

DETAILED DESCRIPTION OF THE INVENTION

Figure 1:
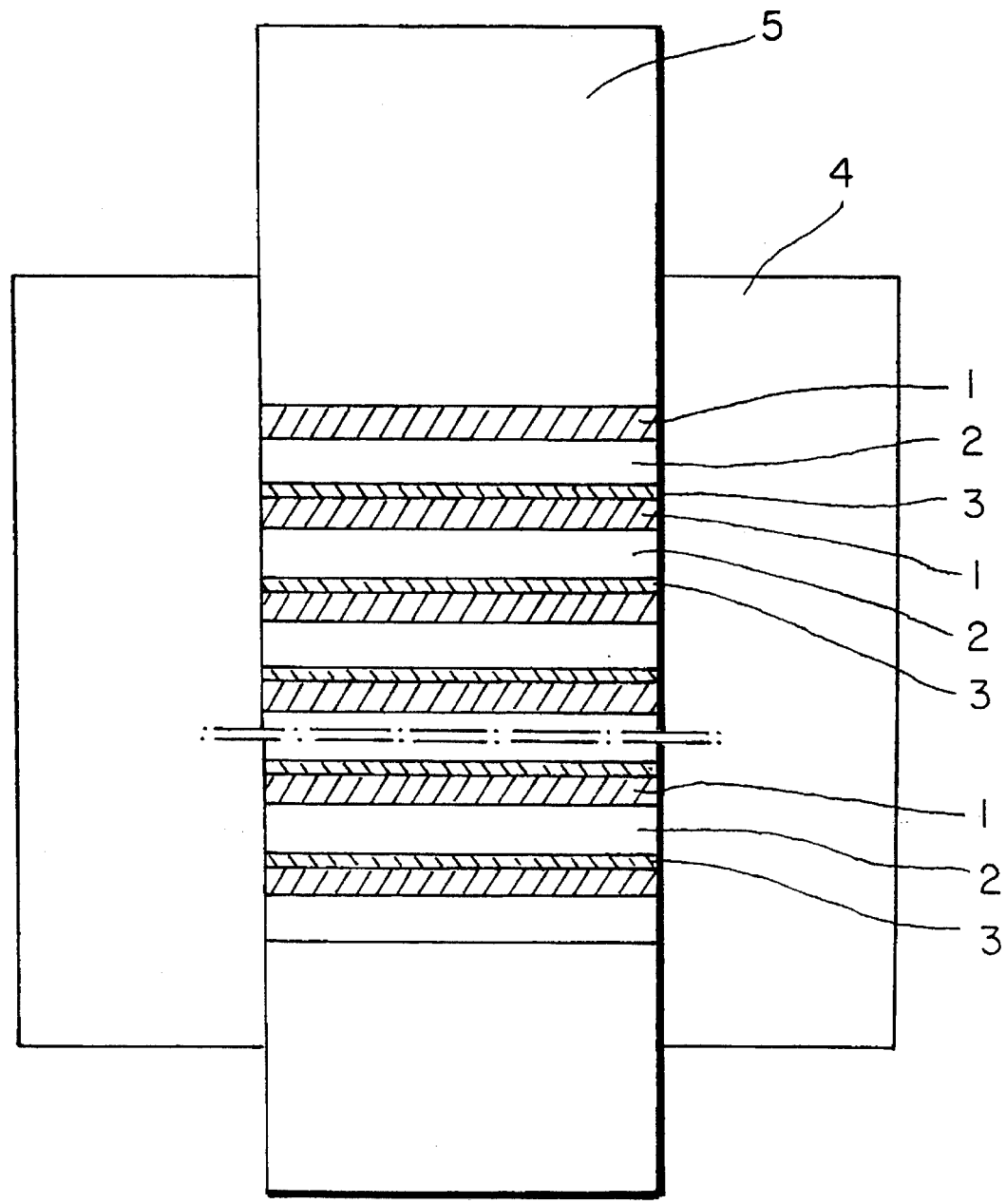
FIGS. 1 and 2 are schematic vertical elevation views showing essential parts in the case of simultaneous production of a plurality of combination units of base materials, which are used for the description of examples of the present invention.

As practical modes of the present invention, the following processes and composite materials are exemplified, but the present invention is not construed as being limited to them:

(1) A process for producing a composite material according to the above second aspect of the present invention, wherein the magnetic metal plate such as of iron or stainless steel and the aluminum or aluminum alloy plate are clad together directly by an axial hot pressing without interposing an intermediate layer between the magnetic metal plate and the aluminum or aluminum alloy plate;

(2) A process for producing a composite material according to the above second aspect of the present invention, wherein a metal layer is formed on the surface of each or one of the magnetic metal plate and the aluminum or aluminum alloy plate, the metal layer having a melting point which is intermediate of the magnetic metal plate and the aluminum or aluminum alloy plate, or is the same as the melting point of the magnetic metal plate or the aluminum or aluminum alloy plate, and the resulting magnetic metal plate and aluminum or aluminum alloy plate are subsequently subjected to cladding by an axial hot pressing in such a manner that the metal layer is interposed between the magnetic metal plate and the aluminum or aluminum alloy plate;

(3) A process for producing a composite material according to the above second aspect of the present invention, wherein a metal layer is formed on the surface of each or one of the magnetic metal plate and the aluminum or aluminum alloy plate, the metal layer having a thermal expansion coefficient which is intermediate of the magnetic metal plate and the aluminum or aluminum alloy plate, and the resulting magnetic metal plate and aluminum or aluminum alloy plate are subsequently subjected to cladding by an axial hot pressing in such a manner that the metal layer is interposed between the magnetic metal plate and the aluminum or aluminum alloy plate;

(4) A process for producing a composite material according to the above mode (2) or (3), wherein the metal layer comprises at least one of Cu, Al, Ni, Ag, solder, Sn, and alloys thereof. The metal layer preferably comprises a Cu plating layer having an Ni under plating layer;

(5) A process for producing a composite material according to the above mode (2) or (3), wherein the metal layer is formed by metal plating, vapor deposition, ion deposition or molten metal immersion. The metal layer is preferably formed by metal plating and comprises a Cu plating layer having an Ni under plating layer;

(6) A process for producing a composite material according to the above mode (2) or (3), wherein the metal layer is clad on the magnetic metal plate such as of iron or stainless steel in advance by simultaneous rolling;

(7) A process for producing a composite material according to the above mode (1), (2) or (3), wherein the surface roughness of each or one of the magnetic metal plate such as of iron or stainless steel and the aluminum or aluminum alloy plate has been increased by an appropriate means such as sand blasting, and the resulting magnetic metal plate and aluminum or aluminum alloy plate are subsequently subjected to cladding by an axial hot pressing in such a manner that the roughened surface is interposed between the magnetic metal plate and the aluminum or aluminum alloy plate;

(8) A process for producing a composite material molding according to the above third aspect of the present invention, wherein the process comprises the steps of: cladding a magnetic metal plate and an aluminum or aluminum alloy plate by an axial hot pressing; coating a fluorine resin on the surface of the aluminum or aluminum alloy plate; and subjecting the resulting composite plate material to press molding and/or stamping and cutting;

(9) A process for producing a composite material according to the above second aspect of the present invention, wherein one sheet of the magnetic metal plate and one sheet of the aluminum or aluminum alloy plate superposed on each other are used as a combination unit, a plurality of the combination unit are superposed on one another via a releasing material having a melting point higher than that of any of the magnetic metal plate and the aluminum or aluminum alloy plate to form a laminate and then the resulting laminate is clad by an axial hot pressing;

(10) A process for producing a composite material according to the above mode (2) or (3), wherein one sheet of the magnetic metal plate and one sheet of the aluminum or aluminum alloy plate superposed on each other are used as a combination unit, at least one of the magnetic metal plate and the aluminum or aluminum alloy plate has the metal layer on the surface thereof, a plurality of the combination unit are superposed upon one another without interposing a releasing material to form a laminate, and then the resulting laminate is clad by an axial hot pressing;

(11) A process for producing a composite material molding according to the above third aspect of the present invention wherein the composite material molding is a utensil of an electromagnetic cooker;

(12) A composite material, a process for producing a composite material or a process for producing a composite material molding according to the above first, second or third aspect of the present invention, wherein the axial hot pressing is carried out at a temperature within the range of from 250° to 600° C.;

(13) A composite material, a process for producing a composite material or a process for producing a composite material molding according to the above first, second or third aspect of the present invention, wherein the axial hot pressing is carried out at a pressure within the range of from 200 to 1,000 kg/cm$^2$;

(14) A composite material, a process for producing a composite material or a process for producing a composite material molding according to the above first, second or third aspect of the present invention, wherein the axial hot pressing is carried out for a pressuring time within the range of from, 10 minutes to 3 hours;

(15) A composite material, a process for producing a composite material or a process for producing a composite material molding according to the above first, second or third aspect of the present invention, wherein the axial hot pressing is carried out in an atmosphere of a reduced pressure of $10^{-1}$ Torr or below;

(16) A process for producing a composite material according to the above mode (1), wherein the axial hot pressing for direct cladding without interposing an intermediate layer is carried out at a temperature within the range of from 450° to 600° C., under a pressure of 400 kg/cm$^2$ or more and for a period of 30 minutes or more;

(17) A process for producing a composite material according to the above mode (2) or (3), wherein cladding by the axial hot pressing is carried out at a temperature within the range of from 250° to 450° C., under a pressure of 250 kg/cm$^2$ or more and for a period of 30 minutes or more;

(18) A process for producing a composite material according to the above mode (2) or (3), wherein the metal layer is formed on the surface of the plates by metal plating to a thickness of from 5 to 20 μm, and the resulting plates are clad by the axial hot pressing;

(19) A process for producing a composite material according to the above mode (9), wherein the releasing material has a thickness of 3 mm or less;

(20) A process for producing a composite material according to the above mode (9), wherein the releasing material is in the form of a sheet, a thin plate, a knitting, cloth or powder;

(21) A process for producing a composite material according to the above mode (9), wherein the releasing material comprises at least one of molybdenum, tungsten, alumite, carbon and ceramics (such as alumina, zirconia and silicon nitride);

(22) A composite material, a process for producing a composite material or a process for producing a composite material molding according to the above first, second or third aspect of the present invention, wherein a pressure mold assembly for use in the axial hot pressing comprises an iron-based alloy, a ceramic compound or carbon;

(23) A composite material, a process for producing a composite material or a process for producing a composite material molding according to the above first, second or third aspect of the present invention, wherein the composite material has a clad strength of 3 kg or more per a width of 5 mm;

(24) A process for producing a composite material molding according to the above mode (11), wherein the magnetic metal plate is a ferrite stainless steel plate;

(25) A process for producing a composite material molding according to the above mode (11), wherein the aluminum alloy plate is an Mg–Mn series aluminum alloy plate; and

(26) A process for producing a composite material molding according to the above mode (11), wherein the composite material molding has a fluorine resin coating on the surface of the aluminum or aluminum alloy opposite of the magnetic metal plate.

According to the present invention, in the case of an electromagnetic cooker for example, the magnetic metal plate of iron, stainless steel or the like is used as the outside material of a receptacle and as a heat-generating layer of induction heating. The aluminum or aluminum alloy plate is used as the inside material of a receptacle and as an excellent heat-conducting layer for the diffusion of heat from the heat-generating layer.

The thickness of the magnetic metal plate is generally 0.1 mm or more, and preferably from 0.5 to 0.6 mm. The thickness of the aluminum or aluminum alloy plate is generally from 0.5 to 3.0 mm, and preferably from 1.0 to 2.0 mm.

The inner surface of the receptacle, namely the surface of the aluminum or aluminum alloy plate opposite the magnetic metal plate, may be coated with a fluorine resin in order to prevent sticking of foods such as cooked rice.

The coating methods and materials of the fluorine resin is not particularly limited, and conventional techniques disclosed, for example, in JP-A-3-57184 can be applied in the present invention.

The constitution of the fluorine resin layer coated on the aluminum or aluminum alloy plate is not particularly limited. Examples of the fluorine resin include a polytetrafluoroethylene resin, a tetrafluoroethylene-perfluoroalkyl vinyl ether copolymer, and mixtures thereof. The fluorine resin layer may be a single layer or may have a multi-layer constitution. Before coating the fluorine resin, a known primer layer may be provided on the aluminum or aluminum alloy plate. The surface of the aluminum or aluminum alloy plate to be coated with the fluroine resin may be subjected to a surface treatment such as electrochemical etching or blasting.

According to the present invention, cladding of the magnetic metal plate and aluminum or aluminum alloy plate is effected by means of an axial hot pressing instead of the prior art isotropic hot pressing.

The axial hot pressing itself is a known process. In the conventional axial hot pressing, a powder material such as of a ceramic compound is sintered to a high density by putting the powder in a mold assembly consisting of a mold and a stamp and simultaneously applying a temperature and an axial pressure to the powder using an apparatus equipped with a heating furnace and an oil press. In one embodiment of the present invention, the plates (i.e., a magnetic metal plate and an aluminum or aluminum alloy plate) and a releasing material, if any, are laminated in multiple layers in the mold where a powder material is arranged in the case of the conventional process, and the laminate is subjected to cladding by the axial hot pressing.

Figure 3:
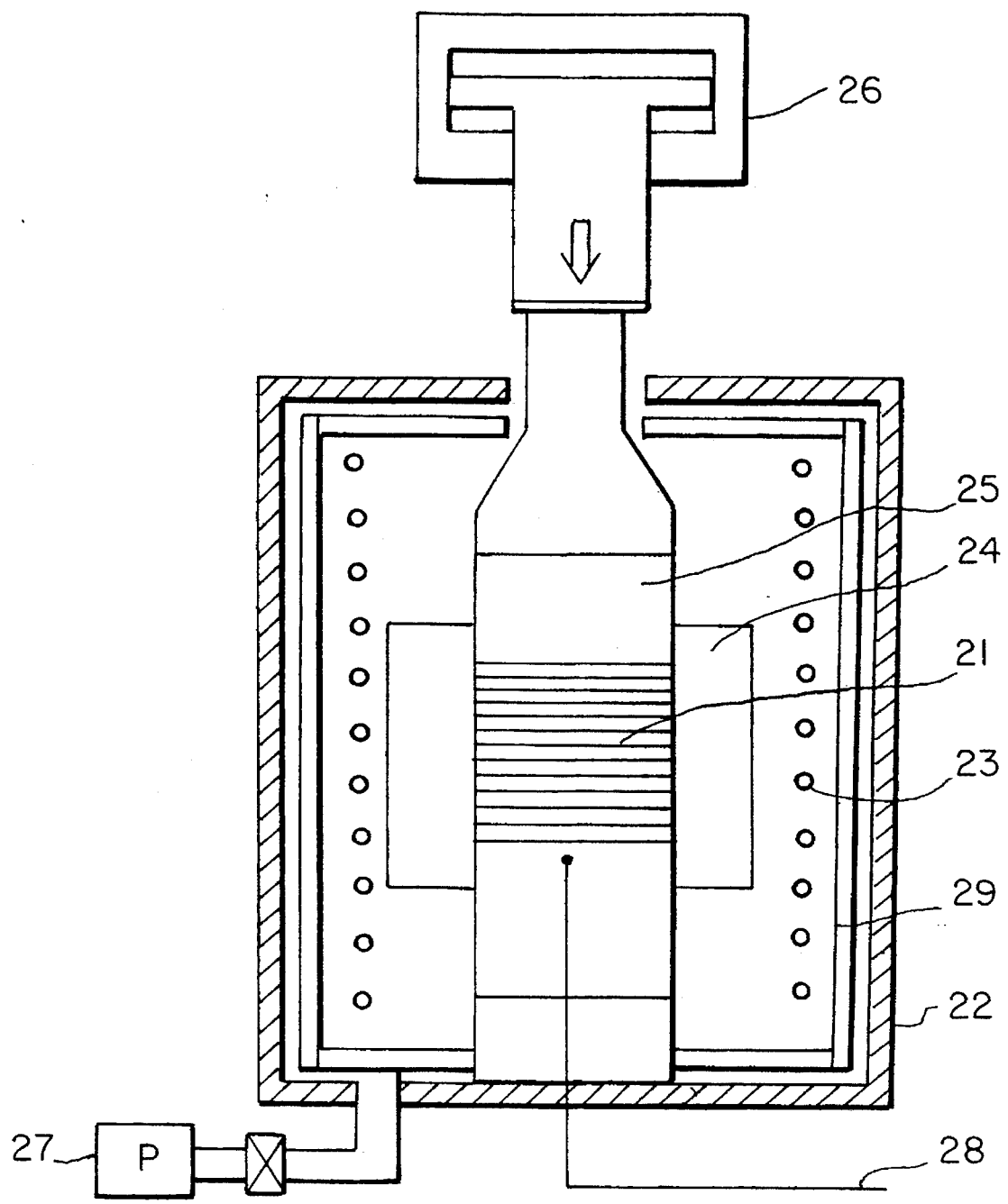
FIG. 3 is a schematic view of axial hot pressing.

A schematic view of the axial hot pressing process of the present invention is shown in FIG. 3, in which numeral 21 denotes a laminate of plates and a releasing material, 22 denotes a furnace, 23 denotes a heater, 24 denotes a mold, 25 denotes a stamp, 26 denotes an oil press apparatus, 27 denotes a vacuum pump, 28 denotes a thermo couple, and 29 denotes a heat insulating material.

According to the axial hot pressing process of the present invention, facility and operation costs are inexpensive because a high pressure gas is not used, in addition to other advantages in that capsules are not required and the mold assembly can be used repeatedly. In comparison with a compressor-aided application of gas pressure used in the prior art, application and reduction of pressure by the use of an oil pump in the present invention can be made quickly, and the cycle time can also be shortened. The inventors of the present invention have found that diffusion between clad metals or through an intermediate metal layer can be effected and a practically sufficient clad strength can be obtained even by such a simple and easy axial hot pressing.

The inventors have found also that decrease in the plate thickness hardly occurs, variation in the plate thickness therefore is markedly small, adhesion of foreign materials and generation of flaws do not occur, and the resulting plate can bear press working because of its even and unusually high clad strength.

With regard to the atmosphere of the axial hot pressing, the process may be carried out in the air or in a non-oxidizing gas such as Ar, $N_2$, He, $CO_2$ or the like, but preferably under a reduced pressure of $10^{-1}$ Torr or less, more preferably $10^{-2}$ Torr or less, from the view point of enhancing diffusion between cladding metals by reducing influences of gas molecules upon the cladding interface. Although increase in the degree of vacuum as high as possible is desirable, the present inventors have found that, from the economic point of view, practically excellent adhesion strength can be obtained at a vacuum degree of around $10^{-2}$ Torr which can be obtained easily by using a rotary pump.

The axial hot pressing can preferably be carried out at a temperature of from 250° to 600° C. If the temperature is less than 250° C., the diffusion of metal atoms between metals to be clad or in an intermediate metal layer tends to be insufficient, thus resulting in insufficient clad strength. If the temperature is higher than 600° C., crystal grains tend to grow in the aluminum or aluminum alloy plate, thus causing problems such as decreased strength and formation of rough surface during a drawing step.

When cladding of metal plates by the axial hot pressing is directly carried out without interposing an intermediate layer, the axial hot pressing may be effected preferably at a temperature within the range of from 450° to 600° C., under a pressure of 400 kg/cm² or more and for a period of 30 minutes or more. A higher temperature and a higher pressure are preferred for the mutual diffusion between Al atom and Fe, Ni and Cr atoms. It may be because the diffusion must occur through the surface oxide layer on the aluminum or aluminum alloy plate and the magnetic metal plate.

When cladding of metal plates by the axial hot pressing is carried out by interposing a metal layer such as Cu, Ni, Al, Ag, solder, Sn, and alloys thereof as an intermediate layer, the axial hot pressing may be effected preferably at a temperature within the range of from 250° to 450° C. under a pressure of 250 kg/cm² or more and for a period of 30 minutes or more. When the axial hot pressing is carried out after coating a metal layer such as Cu, Ni, Al, Ag, solder, Sn, and alloys thereof by a metal plating or the like technique on the plate surface, it is considered that the metal layer can function as a binder by diffusing to both the magnetic metal plate and the aluminum or aluminum alloy plate even under relatively low temperature and pressure conditions. If the temperature is too high, the metal layer would disappear because of exceeded dispersion, thus entailing decreased clad strength. It also will cause formation of a brittle compound between the metals, which is also undesirable.

When a clad material produced from a magnetic metal plate and an aluminum or aluminum alloy plate by the axial hot pressing according to the present invention is applied to cooking utensils and the like, a three-layer composite material composed of the magnetic metal plate, the aluminum or aluminum alloy plate and a fluorine resin layer can be produced directly, using the aluminum or aluminum alloy plate prepared in advance by coating a fluorine resin layer on the surface thereof, and subjecting the resin-coated aluminum or aluminum alloy plate and the magnetic metal plate to cladding by the axial hot pressing.

In such a mode of the present invention, it is necessary to prevent deterioration of the fluorine resin by setting the pressing temperature at a low level. Because of this, it is preferred to interpose a metal layer between the magnetic metal plate and the aluminum or aluminum alloy plate. In addition, because of the low pressing temperature, it is preferred to use a releasing material for the purpose of preventing the adhesion of the fluorine resin to the magnetic metal plate and preventing the formation of rough spots on the surface of the fluorine resin. A material having a melting point equal to or lower than that of the aluminum or aluminum alloy plate, such as aluminum thin plate, foil or the like may be used. In this instance the axial hot pressing may be carried out preferably at a temperature of 450° C. or below. The temperature if higher than 450° C. would cause deterioration of the fluorine resin coated on the surface of the aluminum or aluminum alloy plate.

Although suitable pressure for the axial hot pressing varies depending on the other conditions as described in the foregoing, it may preferably be 200 kg/cm² or more an less than 1,000 kg/cm². Pressure lower than the above range tends to require uneconomically prolonged period of time for attaining sufficient diffusion, and pressure higher than the above range tends to require uneconomical equipments and to entail a difficulty in releasing the resulting product from the mold assembly because such a high pressure may cause unnecessary deformation (reduction in thickness) of the aluminum or aluminum alloy plate.

A characteristic advantage of the cladding by the axial hot pressing according to the present invention is that a practical clad strength can be obtained independently of the presence or absence of an intermediate layer when conditions are optimized. The use of the intermediate layer is advantageous in terms of its effects to shift the cladding conditions to low temperature and low pressure sides and to yield a markedly increased clad strength under optimum conditions. In view of this, it is important to select materials of the intermediate layer.

The present inventors have examined various intermediate layer materials and found that Cu, Ni, Al, Ag, solder, Sn and the like are useful as such materials. Diffusion coefficients of these metals with regard to the magnetic metal plate and the aluminum or aluminum alloy plate have not been fully reported in literatures. However, it is obvious that each of these metals has a melting point which is intermediate of or the same as those of the magnetic metal plate and the aluminum or aluminum alloy plate. The term "same as" as used herein means that cladding is carried out after forming an aluminum or aluminum alloy layer on the magnetic metal plate.

Coordination of the intermediate layer in view of thermal expansion coefficient is also an important factor. Thermal expansion coefficients of the magnetic metal plate and the aluminum or aluminum alloy plate are greatly, almost doubly, different from each other. In consequence, even when these plates are clad at a high temperature, they are apt to cause separation because of the generation of stress in the interface at the time of cooling. Since each of the aforementioned intermediate layer metals has a thermal expansion coefficient which is intermediate of those of the magnetic metal plate and the aluminum or aluminum alloy plate, it seems that the presence of these metals in the interface is effective in compensation of the interfacial stress and improving clad strength by the axial hot pressing.

It is not essential that the intermediate layer has a thermal expansion coefficient which is intermediate of the magnetic metal plate and the aluminum or aluminum alloy plate. If the intermediate layer has a thermal expansion coefficient which is substantially the same as the magnetic metal plate or the aluminum or aluminum alloy plate, the superior effect of the present invention can be attained.

The intermediate metal layer may comprise aluminum of an aluminum alloy, but should be different in material from the aluminum or aluminum alloy plate.

When an intermediates metal layer is formed on the surface of a plate in advance, it nay be effected by a wet method such as metal plating, paste application or the like, or by a dry method such as vacuum deposition, ion deposition, sputtering or the like, as well as flame spraying, molten metal immersion or the like. By the metal plating method, Cu, Ni, Ag, or the like metal can be made into a coat film having a thickness of from several μm to several tens μm relatively cheaply. By the dry method such as vacuum deposition, ion deposition or the like, Al, Cu, Ni, Ag, or the like metal can be made into a coat film (several μm to several tens μm in thickness) having excellent purity and adhesion without causing pollution problems. Also, a relatively thick coat film can be formed by adhering a molten metal to the surface of the plate such as the case of flame spraying, molten metal immersion and the like.

Regardless of the above coating methods, when an intermediate metal layer is formed, it is effective for the improvement of adhesion to remove impurities thoroughly from the coat-forming surface of the plate in advance by washing or the like cleaning means. In the case of metal plating, it is preferred to employ a pretreatment step for the removal of oxides from the plate surface. In the case of deposition, it is preferred to wash the plate surface in advance by glow discharge or the like means.

In addition, it is effective to increase in the surface roughness of each or one of the magnetic metal plate and the aluminum or aluminum alloy plate by an appropriate means such as sand blasting. The surface roughening is effective in improving adhesion of an intermediate layer or, even in the case of direct cladding without forming an intermediate layer, in improving clad strength. Such effects is considered as the results of surface cleaning and biting (anchoring effect) of the intermediate layer and/or the counterpart plate to be clad at the time of the axial hot pressing.

As an alternative of the above method in which an intermediate layer is coated on the surface of the plate, a material may be used which is obtained in advance by cladding a thin metal layer to be used as an intermediate layer on a magnetic metal plate such as of iron or stainless steel by means of simultaneous rolling method. For example, since clad materials such as Cu/stainless steel and the like are commercially produced by simultaneous rolling, such clad materials when stamped into discs can be subjected directly to the axial hot pressing without employing metal plating, deposition and the like steps.

The method for providing the intermediate layer and its thickness is not limited to the above-mentioned embodiments. The intermediate layer may be, for example, a thin layer formed by a vapor deposition method (having a thickness of generally 10 μm or less, preferably 1 μm or less), a thin layer formed by a metal plating method (having a thickness of generally 30 μm or less, preferably from 5 to 20 μm), a thick layer formed by a paste coating method (having a thickness of generally 100 μm or less, preferably 30 to 50 μm), and a thin plate such as a foil (having a thickness of 150 μm or less, preferably about 50 μm) and a thin metal plate (having a thickness of 150 μm or more).

In the present invention, the intermediate layer is preferably formed by metal plating and preferably comprises a Cu plating layer having an Ni under plating layer.

The inventors of the present invention have found that the following process is effective as a means to apply the axial hot pressing-aided cladding to an inexpensive and efficient large scale production process.

That is, when cladding is carried our by the axial hot pressing, one sheet of a magnetic metal plate and one sheet of an aluminum or aluminum alloy plate superposed on each other are used as a combination unit, a plurality of the combination unit are superposed upon one another via a releasing material having a melting point higher than that of any of the magnetic metal plate and the aluminum or aluminum alloy plate and then the thus laminated plates in an appropriate mold is subjected to the axial hot pressing. Higher melting point of the releasing material means that the material has a smaller diffusion coefficient. A material having a small diffusion coefficient can act efficiently as a releasing material because it does not react with either the magnetic metal plate or the aluminum or aluminum alloy plate when treated by the axial hot pressing.

According to the above-described process, a plurality of the combination units can be made into clad plates of respective combination units because of the presence of the releasing material.

Examples of the releasing material include sheet-like materials such as ceramic sheet (e.g., alumina sheet), carbon sheet and the like, knitting materials such as glass cloth, cloth-like materials and powder materials. Also useful as the releasing material is a material which comprises Mo (molybdenum), W (tungsten), alumite, carbon or a ceramics (alumina, zirconia or silicon nitride).

The releasing material generally has a thickness of 3 mm or less, and preferably 2 mm or less. The releasing material should be as thin as possible, but should be rich in durability. A thick releasing material is not desirable from economical point of view, because it reduces the number of the combination units of plates to be laminated in the mold. Also, a releasing material having too small thickness or low strength is not desirable from economical point of view, because such a material cannot be used repeatedly.

When an intermediate metal layer is formed on one surface of a plate, one sheet of a magnetic metal plate and one sheet of an aluminum or aluminum alloy plate can be used as a combination unit and laminated with each other in such a manner that the intermediate metal layer is interposed between the two plates. In this instance, a plurality of the combination units can be made into clad plates of respective combination units even in the absence of a releasing material when the axial hot pressing is carried out at a relatively low temperature (250° to 400° C.).

The aluminum or aluminum alloy plate may be coated with a fluorine resin. When the aluminum or aluminum alloy plate is coated with a fluorine resin, it is preferred in most cases to use a releasing material because direct contact of the fluorine resin layer with the magnetic metal plate due to the absence of the releasing material will cause, depending on the axial hot pressing conditions, strong adhesion between the fluorine resin layer and the magnetic metal plate or formation of rough spots on the surface of the fluorine resin layer at the time of releasing.

A mold of the pressure mold assembly for use in the axial hot pressing functions as a guide to prevent the plates and releasing material laminated in the mold from crumbling at the time of pressurization. The upper and lower stamps transfer high pressure of a hydraulic cylinder to the plates. Because of this, these stamps should be made of high temperature- and high pressure-resistant materials such as an iron-based heat-resistant alloy, ceramics, carbon and the like.

The optimum clad strength of the composite plate attained by the axial hot pressing according to the present invention can be selected depending on the use and required properties of the composite plate. In the case of the application to electromagnetic cookers which generally require deep drawing in the post-processing step, the minimum clad strength which hardly causes peeling and the like problems is 3 kg or more as a peeling strength of a composite plate having a width of 5 mm.

According to the present invention, generation of heat by electromagnetic induction heating can be attained by the use of a ferrite stainless steel plate as the magnetic metal plate, and the resulting composite material therefore can be applied to inner pots of electromagnetic heating type jar rice cookers or receptacles of electromagnetic cookers.

Also, according to the present invention, receptacles having excellent corrosion resistance can be obtained when an Ag-Mn series aluminum alloy plate is used as the aluminum alloy plate.

The following examples are provided to further illustrates the present invention. It is to be understood, however, that the examples; are for purpose of illustration only and are not to be construed to limit the scope of the invention.

FIG. 1 is a schematic vertical elevation view for use in the description of Examples 1 to 35 of the present invention. In FIG. 1, numeral 1 denotes a magnetic metal plate such as of iron, stainless steel or the like, 2 denotes an aluminum or aluminum alloy plate, 3 denotes a releasing material having a melting point higher than those of the magnetic metal, aluminum and aluminum alloy, 4 denotes a mold, and 5 denotes a stamp. Mold 4 and stamp 5 constitute a mold assembly for use in the axial hot pressing.

Figure 2:
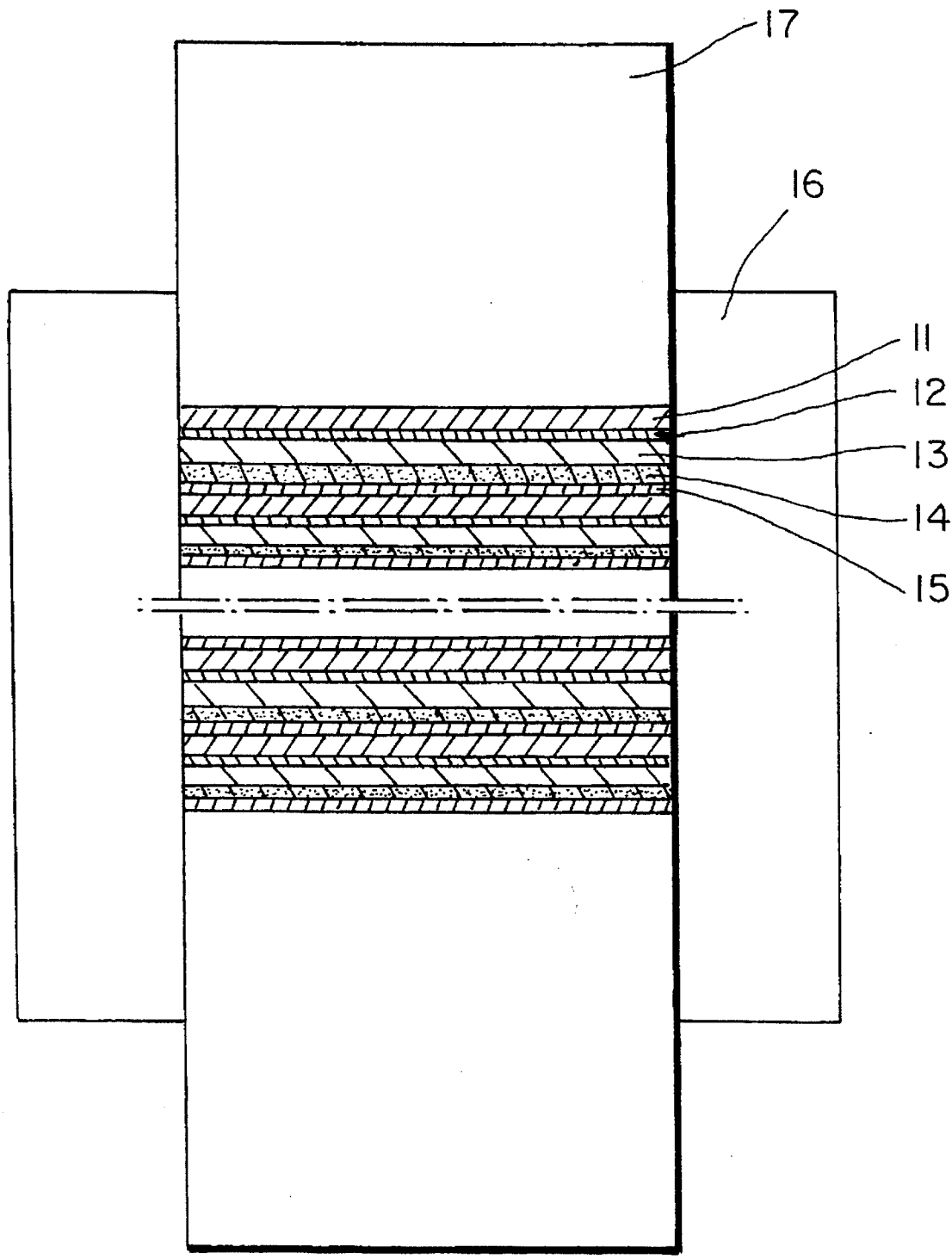

FIG. 2 is also a schematic vertical elevation view for use in the description of Examples 36 to 61 of the present invention. In FIG. 2, numeral 11 denotes a magnetic metal plate such as of iron, stainless steel or the like, 12 denotes a metal layer, 13 denotes an aluminum or aluminum alloy plate, 14 denotes fluorine resin, 15 denotes a releasing material, and 16 and 17 denote a mold and a stamp, respectively, which constitute a mold assembly for use in the axial hot pressing.

EXAMPLE 1

A circular plate of a JIS 3004 aluminum alloy, MG-110 (containing 0.6 to 0.8% of Mg and 0.9 to 1.1% of Mn; a product of Sumitomo Light Metal Industries, Ltd.), having a thickness of 1.5 mm and a diameter of 425 mm was used as the aluminum plate 2 shown in FIG. 1, and a SUS 430 circular plate having a thickness of 0.5 mm and a diameter of 425 mm was used as the stainless steel plate 1. After washing surfaces of these plates (10 pieces for each) with alkali, they were superposed reciprocally upon one another. A carbon sheet 3 as the releasing material was interposed between the combination units, each combination unit consisting of one sheet of the aluminum plate and one sheet of the stainless steel plate to be used as a unit of a composite plate material.

The resulting laminate as one set was put in a mold. After arranging a stamp, the mold assembly was put in a vacuum furnace of the axial hot pressing apparatus. Under a vacuum degree of $5 \times 10^{-2}$, temperature in the furnace was increased to 500° C., pressure in the furnace was increased to 500 kg/cm$^2$ using a hydraulic system and these conditions were maintained for 2 hours, followed by pressure release and cooling. In this way, pieces of an aluminum/stainless steel clad plate were obtained.

The clad strength of the aluminum/stainless steel clad plate was found to be 3 to 7 kg per a width of 5 mm and, unlike the case of clad materials obtained by the conventional rolling method, was uniform and stable without having areas of partially decreased clad strength. Each piece of the clad plate had a thickness of 2 mm, with no changes in the thickness caused by the cladding. Adhesion of foreign materials and formation of flaws were not found.

The aluminum side surface of the clad plate was subjected to electrolytic etching in a sodium chloride aqueous solution at an electricity quantity of 20 coulomb/cm$^2$, thereby forming minute unevenness on the aluminum surface to which was subsequently coated a fluorine resin layer by applying an emulsion of the resin. The thus coated plate was made into a shape of a rice cooker inside pot having a depth of 146 mm and an inside diameter of 221 mm by using oil press, thus obtaining a receptacle according to the present invention. The receptacle showed no generation of breakage, crinkling and the like.

EXAMPLES 2 TO 35 AND

The process of Example 1 was repeated except that the plates were subjected to various types of surface treatments, or temperature, pressure and time for the axial hot pressing were varied, and clad strengths and deep drawing characteristics of the resulting products were evaluated. The results are shown in Tables 1, 2 and 3, together with the results of Example 1.

TABLE 1

| No. | Magnetic metal plate | | | Aluminum (alloy) plate | | | Releasing material | | Axial hot pressing | | | Clad strength (kg/5 mm) | Deep drawing (*) |
|---|---|---|---|---|---|---|---|---|---|---|---|---|---|
| | Material | Thickness (mm) | Surface treatment | Material | Thickness (mm) | Surface treatment | Material | Thickness (mm) | Temp. (°C.) | Pressure (kg/cm$^2$) | Time (hr) | | |
| 1 | SUS 430 | 0.5 | washing only | MG 110 | 1.5 | washing only | carbon plate | 3 | 500 | 500 | 2.0 | 3–7 | ++ |
| 2 | SUS 430 | 0.5 | washing only | MG 110 | 1.5 | washing only | carbon plate | 3 | 525 | 500 | 1.0 | 3–8 | ++ |
| 3 | SUS 430 | 0.5 | washing only | MG 110 | 1.5 | washing only | carbon plate | 3 | 475 | 500 | 3.0 | 3–10 | ++ |
| 4 | SUS 430 | 0.5 | washing only | MG 110 | 1.5 | washing only | carbon plate | 3 | 525 | 500 | 0.5 | 1–3 | + |
| 5 | SUS 430 | 0.5 | washing only | MG 110 | 1.5 | washing only | carbon plate | 3 | 500 | 300 | 1.5 | 2.5–6 | + |
| 6 | SUS 430 | 0.5 | Ni plating, 5 μm | MG 110 | 1.5 | Cu plating 5 μm | carbon plate | 3 | 450 | 500 | 1.0 | 7–10 | +++ |
| 7 | SUS 430 | 0.5 | Ni plating, 5 μm | MG 110 | 1.5 | Cu plating 5 μm | carbon plate | 3 | 450 | 500 | 2.0 | 4–5 | ++ |
| 8 | SUS 430 | 0.5 | Ni plating, 5 μm | MG 110 | 1.5 | Cu plating 5 μm | carbon plate | 3 | 425 | 500 | 1.0 | 5–8 | ++ |
| 9 | SUS 430 | 0.5 | Ni plating, 5 μm | MG 110 | 1.5 | Cu plating 5 μm | carbon plate | 3 | 425 | 500 | 0.5 | 4–7 | ++ |
| 10 | SUS 430 | 0.5 | Ni plating, 5 μm | MG 110 | 1.5 | Cu plating 5 μm | carbon plate | 3 | 400 | 400 | 2.0 | 5–7 | ++ |
| 11 | SUS 430 | 0.5 | Cu plating, 7 μm | MG 110 | 1.5 | Cu plating 7 μm | carbon plate | 3 | 450 | 500 | 1.0 | 15–30 | +++ |
| 12 | SUS 430 | 0.5 | Cu plating, 7 μm | MG 110 | 1.5 | Cu plating 7 μm | carbon plate | 3 | 425 | 500 | 2.0 | 10–20 | +++ |
| 13 | SUS 430 | 0.5 | Cu plating, 7 μm | MG 110 | 1.5 | Cu plating 7 μm | carbon plate | 3 | 400 | 500 | 1.0 | 7–15 | +++ |

(*): +++, excellent; ++, very good; +, good

TABLE 2

| No. | Magnetic metal plate Material | Thickness (mm) | Surface treatment | Aluminum (alloy) plate Material | Thickness (mm) | Surface treatment | Releasing material Material | Thickness (mm) | Axial hot pressing Temp. (°C.) | Pressure (kg/cm$^2$) | Time (hr) | Clad strength (kg/5 mm) | Deep drawing (*) |
|---|---|---|---|---|---|---|---|---|---|---|---|---|---|
| 14 | SUS 430 | 0.5 | Cu plating, 7 μm | MG 110 | 1.5 | Cu plating, 7 μm | carbon plate | 3 | 375 | 500 | 2.0 | 5–10 | +++ |
| 15 | SUS 430 | 0.5 | Cu plating, 7 μm | MG 110 | 1.5 | Cu plating, 7 μm | none | — | 350 | 400 | 3.0 | 4–7 | ++ |
| 16 | SUS 430 | 0.5 | Ni plating | pure Al | 1.5 | washing only | carbon plate | 3 | 500 | 500 | 3.0 | 6–20 | +++ |
| 17 | SUS 430 | 0.5 | Ni plating | pure Al | 1.5 | washing only | carbon plate | 3 | 475 | 500 | 2.0 | 3–6 | ++ |
| 18 | SUS 430 | 0.5 | Ni plating | pure Al | 1.5 | washing only | carbon plate | 3 | 500 | 500 | 1.0 | 2–5 | ++ |
| 19 | SUS 430 | 0.5 | Ag plating, 5 μm | MG 110 | 1.5 | Cu plating 5 μm | carbon plate | 3 | 450 | 350 | 1.0 | 5–8 | ++ |
| 20 | SUS 430 | 0.5 | Ag plating, 5 μm | MG 110 | 1.5 | Cu plating 5 μm | carbon plate | 3 | 400 | 300 | 1.0 | 4–7 | ++ |
| 21 | SUS 430 | 0.5 | Al ion deposition 13 μm | MG 110 | 1.5 | washing only | carbon plate | 3 | 500 | 500 | 2 | 13–18 | +++ |
| 22 | SUS 430 | 0.5 | Al ion deposition 13 μm | MG 110 | 1.5 | Cu plating 5 μm | carbon plate | 3 | 450 | 500 | 2 | 10–16 | +++ |
| 23 | SUS 430 | 0.5 | Al deposition, 5 μm | MG 110 | 1.5 | washing only | carbon plate | 3 | 500 | 500 | 2 | 10–16 | ++ |
| 24 | SUS 430 | 0.5 | Al deposition, 5 μm | MG 110 | 1.5 | Cu plating 5 μm | carbon plate | 3 | 450 | 500 | 2 | 10–16 | ++ |

(*): +++, excellent; ++, very good; +, good

TABLE 3

| No. | Magnetic metal plate Material | Thickness (mm) | Surface treatment | Aluminum (alloy) plate Material | Thickness (mm) | Surface treatment | Releasing material Material | Thickness (mm) | Axial hot pressing Temp. (°C.) | Pressure (kg/cm$^2$) | Time (hr) | Clad strength (kg/5 mm) | Deep drawing (*) |
|---|---|---|---|---|---|---|---|---|---|---|---|---|---|
| 25 | iron 430 | 0.5 | molten Al immersion 20 μm | MG 110 | 1.5 | washing only | carbon plate | 3 | 500 | 500 | 2 | 5–8 | ++ |
| 26 | iron 430 | 0.5 | molten Al immersion 20 μm | MG 110 | 1.5 | Cu plating 5 μm | carbon plate | 3 | 450 | 500 | 2 | 3–7 | ++ |
| 27 | SUS 430 | 0.5 | sand blasting | MG 110 | 1.5 | washing only | carbon plate | 3 | 500 | 500 | 2 | 5–10 | ++ |
| 28 | SUS 430 | 0.5 | sand blasting | MG 110 | 1.5 | sand blasting | carbon plate | 3 | 500 | 500 | 2 | 6–11 | ++ |
| 29 | SUS 430 | 0.5 | washing only | MG 110 | 1.5 | washing only | carbon plate | 3 | 500 | 700 | 2 | 7–12 | +++ |
| 30 | SUS 430 | 0.5 | washing only | MG 110 | 1.5 | washing only | carbon plate | 3 | 500 | 800 | 2 | 8–14 | +++ |
| 31 | SUS 430 | 0.5 | washing only | MG 110 | 1.5 | washing only | carbon sheet | 0.5 | 500 | 500 | 2 | 3–7 | ++ |
| 32 | SUS 430 | 0.5 | washing only | MG 110 | 1.5 | washing only | zirconia plate | 1.5 | 500 | 500 | 2 | 3–7 | ++ |
| 33 | SUS 430 | 0.5 | Ni plating, 5 μm | MG 110 | 1.5 | Cu plating 5 μm | Mo plate | 0.2 | 450 | 400 | 1 | 7–10 | ++ |
| 34 | SUS 430 | 0.5 | Cu plating, 5 μm | MG 110 | 1.5 | Cu plating 5 μm | W plate | 0.15 | 450 | 400 | 1 | 14–28 | +++ |

TABLE 3-continued

| | Magnetic metal plate | | | Aluminum (alloy) plate | | | Releasing material | | Axial hot pressing | | | Clad | Deep |
| | | Thick- | | | Thick- | | | Thick- | | | | | |
| No. | Material | ness (mm) | Surface treatment | Material | ness (mm) | Surface treatment | Material | ness (mm) | Temp. (°C.) | Pressure (kg/cm²) | Time (hr) | strength (kg/5 mm) | drawing (*) |
|---|---|---|---|---|---|---|---|---|---|---|---|---|---|
| 35 | SUS 430 | 0.5 | Cu plating, 5 μm | MG 110 | 1.5 | Cu plating 5 μm | alumite plate | 0.4 | 400 | 500 | 1 | 13–26 | +++ |

(*): +++, excellent; ++, very good; +, good

EXAMPLE 36

A circular plate of a JIS 3004 aluminum alloy, MG-110 (containing 0.6 to 0.8% of Mg and 0.9 to 1.1% of Mn; a product of Sumitomo Light Metal Industries, Ltd.), having a thickness of 1.5 mm and a diameter of 360 mm was used as the aluminum plate 13 shown in FIG. 2, and one surface of the aluminum plate was subjected to electrolytic etching in a sodium chloride aqueous solution at an electricity quantity of 20 coulomb/cm², thereby forming minute unevenness on the surface to which was subsequently applied an emulsion of a fluorinated ethylene resin to coat the surface with the fluorine resin layer 14. A SUS 430 circular plate having a thickness of 0.5 mm and a diameter of 360 mm was used as the stainless steel plate 11, and the metal layer 12 composed of Cu was formed on the surface of stainless steel plate to be clad. The thus treated plates (10 pieces for each) were superposed reciprocally upon one another via a releasing material.

The resulting laminate as one set was put in a mold of a mold assembly made of carbon. After arranging a stamp, the mold assembly was put in a vacuum furnace of the axial hot pressing apparatus Under a vacuum degree of $2 \times 10^{-4}$ temperature in the furnace was increased to 400° C., pressure in the furnace was increased to 344 kg/cm² using a hydraulic system and these conditions were maintained for 2 hours, followed by pressure release and cooling. In this way, pieces of an aluminum/stainless steel clad plate were obtained.

The clad strength of the aluminum/stainless steel clad plate was found to be 6 to 8 kg at a width of 5 mm and, unlike the case of clad materials obtained by the usual rolling method, was uniform and stable without having areas of partially decreased clad strength. Each piece of the clad plate had a thickness of 2.0 mm, with no changes in the thickness caused by the cladding. Adhesion of foreign materials and formation of cuts were not found.

The resulting clad plate was made into a shape of an inner pot of a rice cooker by using an oil press to obtain a receptacle according to the present invention. The receptacle showed no generation of breakage, crinkling and the like.

EXAMPLES 37 TO 61 AND

The process of Example 36 was repeated except that the plates were subjected to various types of surface treatments, or temperature, pressure and time for the axial hot pressing were varied, and clad strengths and deep drawing characteristics of the resulting products were evaluated. The results are shown in Tables 4, 5, and 6, together with the results of Example 36.

TABLE 4

| | Magnetic metal plate | | | Aluminum (alloy) plate | | | Releasing material | | Axial hot pressing | | | Clad | Deep |
| | | Thick- | | (*) | Thick- | | | Thick- | | | | | |
| No. | Material | ness (mm) | Surface treatment | Material | ness (mm) | Surface treatment | Material | ness (mm) | Temp. (°C.) | Pressure (kg/cm²) | Time (hr) | strength (kg/5 mm) | drawing (**) |
|---|---|---|---|---|---|---|---|---|---|---|---|---|---|
| 36 | SUS 430 | 0.5 | Cu plating, 5 μm | MG 110 | 1.5 | Cu plating, 5 μm | Al foil | 0.04 | 400 | 344 | 2 | 6–8 | ++ |
| 37 | SUS 430 | 0.5 | Cu plating, 5 μm | MG 110 | 1.5 | Cu plating, 5 μm | Al foil | 0.04 | 425 | 344 | 2 | 6–8 | ++ |
| 38 | SUS 430 | 0.5 | Cu plating, 5 μm | MG 110 | 1.5 | Cu plating, 5 μm | Al foil | 0.04 | 450 | 344 | 2 | 3–6 | + |
| 39 | SUS 430 | 0.5 | Cu plating, 5 μm | MG 110 | 1.5 | Cu plating, 5 μm | Al foil | 0.04 | 350 | 344 | 2 | 5–7 | ++ |
| 40 | SUS 430 | 0.5 | Cu plating, 5 μm | MG 110 | 1.5 | Cu plating, 5 μm | Al foil | 0.04 | 300 | 344 | 2 | 3–6 | + |
| 41 | SUS 430 | 0.5 | Cu plating, 5 μm | MG 110 | 1.5 | Cu plating, 5 μm | Al foil | 0.04 | 400 | 400 | 2 | 7–9 | ++ |
| 42 | SUS 430 | 0.5 | Cu plating, 5 μm | MG 110 | 1.5 | Cu plating, 5 μm | Al foil | 0.04 | 400 | 800 | 2 | 9–12 | ++ |
| 43 | SUS 430 | 0.5 | Cu plating, 5 μm | MG 110 | 1.5 | Cu plating, 5 μm | Al foil | 0.04 | 400 | 400 | 1 | 6–8 | ++ |
| 44 | SUS 430 | 0.5 | Cu plating, 5 μm | MG 110 | 1.5 | Cu plating, 5 μm | Al foil | 0.04 | 400 | 500 | 0.5 | 4–7 | + |

(*): fluorine resin layer already coated on one side of the aluminium (alloy) plate
(**): + , excellent; +, good

TABLE 5

| | Magnetic metal plate | | | Aluminum (alloy) plate | | | Releasing material | | Axial hot pressing | | | Clad | Deep |
| | | | | | | | | | | | | | |
| No. | Material | Thickness (mm) | Surface treatment | (*) Material | Thickness (mm) | Surface treatment | Material | Thickness (mm) | Temp. (°C.) | Pressure (kg/cm²) | Time (hr) | strength (kg/5 mm) | drawing (**) |
|---|---|---|---|---|---|---|---|---|---|---|---|---|---|
| 45 | SUS 430 | 0.5 | Cu plating, 5 μm | MG 110 | 1.5 | Cu plating, 5 μm | Al foil | 0.04 | 400 | 300 | 2 | 5–7 | + |
| 46 | SUS 430 | 0.5 | Cu plating, 3 μm | MG 110 | 1.5 | Cu plating, 3 μm | Al foil | 0.04 | 400 | 500 | 2 | 5–7 | ++ |
| 47 | SUS 430 | 0.5 | Cu plating, 10 μm | MG 110 | 1.5 | Cu plating, 10 μm | Al foil | 0.04 | 400 | 500 | 2 | 7–10 | ++ |
| 48 | SUS 430 | 0.5 | Cu plating, 4 μm | MG 110 | 1.5 | Cu plating, 7 μm | Al foil | 0.04 | 400 | 500 | 1 | 6–8 | ++ |
| 49 | SUS 430 | 0.5 | Cu plating, 4 μm | MG 110 | 1.5 | Cu plating, 7 μm | Mo plate | 0.2 | 400 | 500 | 1 | 6–8 | ++ |
| 50 | SUS 430 | 0.5 | Cu plating, 4 μm | MG 110 | 1.5 | Cu plating, 7 μm | W plate | 0.1 | 400 | 500 | 1 | 6–8 | ++ |
| 51 | SUS 430 | 0.5 | Cu plating, 4 μm | pure Al | 1.5 | Cu plating, 7 μm | W plate | 0.1 | 400 | 500 | 1 | 7–9 | ++ |
| 52 | SUS 430 | 0.5 | Cu plating, 4 μm | pure Al | 1.5 | Sn plating, 5 μm | Al foil | 0.05 | 325 | 500 | 1.5 | 5–7 | + |
| 53 | SUS 430 | 0.5 | Sn plating, 4 μm | MG 110 | 1.5 | Sn plating, 5 μm | Al foil | 0.05 | 325 | 500 | 1.5 | 6–8 | ++ |

(*): fluorine resin layer already coated on one side of the aluminium (alloy) plate
(**): ++, excellent; +, good

TABLE 6

| | Magnetic metal plate | | | Aluminum (alloy) plate | | | Releasing material | | Axial hot pressing | | | Clad | Deep |
| | | | | | | | | | | | | | |
| No. | Material | Thickness (mm) | Surface treatment | (*) Material | Thickness (mm) | Surface treatment | Material | Thickness (mm) | Temp. (°C.) | Pressure (kg/cm²) | Time (hr) | strength (kg/5 mm) | drawing (**) |
|---|---|---|---|---|---|---|---|---|---|---|---|---|---|
| 54 | SUS 430 | 0.5 | Sn plating, 4 μm | MG 110 | 1.5 | Ni plating, 5 μm | SUS plate | 0.01 | 450 | 500 | 2 | 5–7 | + |
| 55 | SUS 430 | 0.5 | Ni plating, 4 μm | MG 110 | 1.5 | Sn plating, 5 μm | SUS plate | 0.01 | 850 | 500 | 1 | 6–8 | + |
| 56 | SUS 430 | 0.5 | Al deposition, 10 μm | MG 110 | 1.5 | Sn plating, 5 μm | carbon sheet | 0.5 | 400 | 500 | 2 | 4–6 | + |
| 57 | SUS 430 | 0.5 | Ag plating, 3 μm | MG 110 | 1.5 | Sn plating, 5 μm | carbon sheet | 0.5 | 350 | 500 | 1 | 5–7 | + |
| 58 | SUS 430 | 0.5 | pewter plating 5 μm | MG 110 | 1.5 | pewter plating 5 μm | Mo plate | 0.1 | 300 | 700 | 1 | 4–6 | + |
| 59 | SUS 430 | 0.5 | pewter plating 5 μm | MG 110 | 1.5 | Sn plating, 5 μm | Mo plate | 0.1 | 350 | 700 | 1 | 4–7 | + |
| 60 | SUS 430 | 0.5 | Sn plating, 5 μm | MG 110 | 1.5 | pewter plating, 5 μm | Mo plate | 0.1 | 350 | 700 | 1 | 3–6 | + |
| 61 | SUS 430 | 0.5 | Cu plating, 5 μm | MG 110 | 1.5 | sand blast + Cu plating 5 μm | Mo plate | 0.1 | 400 | 600 | 2 | 7–10 | ++ |

(*): fluorine resin layer already coated on one side of the aluminium (alloy) plate
(**): ++, excellent; +, good

EXAMPLES 62 TO 66

The process of Example 1 was repeated except that the plates were subjected to various types of surface treatments, or temperature, pressure and time for the axial hot pressing were varied, and clad strengths and deep drawing characteristics of the resulting products were evaluated. The results are shown in Table 7.

EXAMPLES 67 TO 70

The process of Example 36 was repeated except that the plates were subjected to various types of surface treatments, or temperature, pressure and time for the axial hot pressing were varied, and clad strengths and deep drawing characteristics of the resulting products were evaluated. The results are shown in Table 7.

TABLE 7

| | Magnetic metal plate | | | Aluminum (alloy) plate | | | Releasing material | | Axial hot pressing | | | Clad strength (kg/5 mm) | Deep drawing (*) |
|---|---|---|---|---|---|---|---|---|---|---|---|---|---|
| No. | Material | Thickness (mm) | Surface treatment | Material | Thickness (mm) | Surface treatment | Material | Thickness (mm) | Temp. (°C.) | Pressure (kg/cm²) | Time (hr) | | |
| 62 | SUS 430 | 0.5 | Ni under plating 2 μm Cu plating 7 μm | MG 110 | 1.5 | Ni under plating 2 μm Cu plating 7 μm | Carbon | 3 | 450 | 500 | 2.0 | 15–30 | +++ |
| 63 | SUS 430 | 0.5 | Ni under plating 2 μm Cu plating 7 μm | MG 110 | 1.5 | Ni under plating 2 μm Cu plating 7 μm | Carbon | 3 | 400 | 500 | 2.0 | 12–25 | +++ |
| 64 | SUS 430 | 0.5 | Ni under plating 2 μm Cu plating 7 μm | MG 110 | 1.5 | Ni under plating 2 μm Cu plating 7 μm | Carbon | 3 | 350 | 500 | 2.0 | 12–25 | +++ |
| 65 | SUS 430 | 0.5 | Ni under plating 2 μm Cu plating 7 μm | MG 110 | 1.5 | Ni under plating 2 μm Cu plating 7 μm | Carbon | 3 | 300 | 500 | 2.0 | 10–20 | ++ |
| 66 | SUS 430 | 0.5 | Ni under plating 2 μm Cu plating 7 μm | MG 110 | 1.5 | Ni under plating 2 μm Cu plating 7 μm | Carbon | 3 | 250 | 500 | 2.0 | 1–3 | + |
| 67 | SUS 430 | 0.5 | Ni under plating 2 μm Cu plating 7 μm | MG 110 | 1.5 | Ni under plating 2 μm Cu plating 7 μm | Aluminum foil | 0.1 | 400 | 500 | 2.0 | 12–25 | +++ |
| 68 | SUS 430 | 0.5 | Ni under plating 2 μm Cu plating 7 μm | MG 110 | 1.5 | Ni under plating 2 μm Cu plating 7 μm | Aluminum foil | 0.1 | 350 | 500 | 2.0 | 12–25 | +++ |
| 69 | SUS 430 | 0.5 | Ni under plating 2 μm Cu plating 7 μm | MG 110 | 1.5 | Ni under plating 2 μm Cu plating 7 μm | Aluminum foil | 0.1 | 300 | 500 | 2.0 | 10–20 | ++ |
| 70 | SUS 430 | 0.5 | Ni under plating 2 μm Cu plating 7 μm | MG 110 | 1.5 | Ni under plating 2 μm Cu plating 7 μm | Aluminum foil | 0.1 | 250 | 500 | 2.0 | 1–3 | + |

(*): +++, excellent; ++, very good; +, good
In Examples 67 to 70, a fluorine resin layer was coated on one side of the aluminum (alloy) plate.

Although the present invention has been described mainly with regard to receptacles of electromagnetic cookers and an inner pot of a rice cooker in the above examples, this invention is not limited to these examples and can be applied to a broad range of composite material moldings.

Thus, as has been described in the foregoing, in accordance with the present invention, receptacles produced by press molding do not show breakage, crinkling and the like and the composite plate materials do not cause peeling and the like, thus resulting in extremely small fraction defective.

Also, according to the present invention, coating of a fluorine resin to a circular plate of aluminum can be made easily rather than its coating to a clad material, thus rendering possible the reduction of fraction defective and production cost.

In addition, large scale production and cost reduction can be attained when a plurality of base material combination unit are subjected to the axial hot pressing either in the presence or absence of a releasing material.

While the invention has been described in detail and with reference to specific examples thereof, it will be apparent to one skilled in the art that various changes and modifications can be made therein without departing from the spirit and scope thereof.

What is claimed is:

1. A process for producing a composite material, comprising:

providing a first plate and a second plate, said first plate comprising a magnetic metal and said second plate comprising aluminum or an aluminum alloy, wherein at least one of said first plate and said second plate has a metal layer formed on a surface thereof, said metal layer having a melting point which is the same as a melting point of either the first or second plates or between said melting points of the first and second plates, respectively, positioning the plates so that the metal layer is interposed between them, and cladding the plates by an axial hot pressing under a reduced pressure of $10^{-1}$ Torr or less at a temperature of from 300° to 450° C.

2. A process for producing a composite material, comprising:

providing a first plate and a second plate, said first plate comprising a magnetic metal and said second plate comprising aluminum or an aluminum alloy, wherein at least one of said first plate and said second plate has a metal layer formed on a surface thereof, said metal layer having a thermal expansion coefficient which is between thermal expansion coefficients of the first and second plates, respectively, positioning the plates so that the metal layer is interposed between them, and cladding the plates by an axial hot pressing under a reduced pressure of $10^{-1}$ Torr or less at a temperature of from 300° to 450° C.

3. A process for producing a composite material molding, comprising:

providing a first plate and a second plate, said first plate comprising a magnetic metal and said second plate comprising aluminum or an aluminum alloy, wherein at least one of said first plate and said second plate has a metal layer formed on a surface thereof, said metal layer having a melting point which is the same as a melting point of either the first or second plates or between said melting points of the first and second plates, respectively, positioning the plates so that the metal layer is interposed between them, cladding the plates by an axial hot pressing under a reduced pressure of $10^{-1}$ Torr or less at a temperature of from 300° to 450° C., thereby obtaining a composite plate material, and subjecting said composite plate material to at least one of: a) press molding, b) stamping and c) cutting.

4. A process for producing a composite material molding, comprising:

providing a first plate and a second plate, said first plate comprising a magnetic metal and said second plate comprising aluminum or an aluminum alloy, wherein at least one of said first plate and said second plate has a metal layer formed on a surface thereof, said metal layer having a thermal expansion coefficient which is between thermal expansion coefficients of the first and second plates, respectively, positioning the plates so that the metal layer is interposed between them, cladding the plates by an axial hot pressing under a reduced pressure of $10^{-1}$ Torr or less at a temperature of from 300° to 450° C., thereby obtaining a composite plate material, and subjecting said composite plate material to at least one of: a) press molding, b) stamping and c) cutting.

5. A process for producing a composite material molding as claimed in claim 3, wherein said composite material molding is a utensil of an electromagnetic cooker.

6. A process for producing a composite material molding as claimed in claim 4, wherein said composite material molding is a utensil of an electromagnetic cooker.

7. A process for producing a composite material as claimed in claim 1, wherein said metal layer comprises at least one of Cu, Al, Ni, Ag, solder, Sn, and alloys thereof.

8. A process for producing a composite material as claimed in claim 2, wherein said metal layer comprises at least one of Cu, Al, Ni, Ag, solder, Sn, and alloys thereof.

9. A process for producing a composite material as claimed in claim 8, wherein said metal layer comprises a Cu plating layer having an Ni under plating layer.

10. A process for producing a composite material as claimed in claim 1, wherein said metal layer is formed by metal plating, vapor deposition, ion deposition or molten metal immersion.

11. A process for producing a composite material as claimed in claim 2, wherein said metal layer is formed by metal plating, vapor deposition, ion deposition or molten metal immersion, and said metal layer is in the form of a thin or thick film.

12. A process for producing a composite material as claimed in claim 11, wherein said metal layer is formed by metal plating and comprises a Cu plating layer having an Ni under plating layer.

13. A process for producing a composite material as claimed in claim 1, wherein said metal layer is clad on said magnetic metal plate in advance by simultaneous rolling.

14. A process for producing a composite material as claimed in claim 2, wherein said metal layer is clad on said magnetic metal plate in advance by simultaneous rolling.

15. A process for producing a composite material as claimed in claim 1, wherein the surface roughness of at least one of said first plate and said second plate has been increased, and the resulting roughened surface is interposed between said first plate and said second plate prior to said cladding.

16. A process for producing a composite material as claimed in claim 2, wherein the surface roughness of at least one of said first plate and said second plate has been increased, and the resulting roughened surface is interposed between said first plate and said second plate prior to said cladding.

17. A process for producing a composite material as claimed in claim 1, wherein one sheet of said first plate and one sheet of said second plate superposed on each other are used as a combination unit, at least one of said first plate and said second plate having said metal layer on a surface thereof, a plurality of said combination units are superposed on one another without interposing a releasing material to form a laminate, and then said laminate is subjected to said cladding.

18. A process for producing a composite material as claimed in claim 2, wherein one sheet of said first plate and one sheet of said second plate superposed on each other are used as a combination unit, at least one of said first plate and said second plate having said metal layer on a surface thereof, a plurality of said combination units are superposed on one another without interposing a releasing material to form a laminate, and then said laminate is subjected to said cladding.

* * * * *